United States Patent [19]
Semen

[11] Patent Number: 6,126,862
[45] Date of Patent: *Oct. 3, 2000

[54] LOW DUST BALANCED HARDNESS ANTIOXIDANT AGGLOMERATES AND PROCESS FOR THE PRODUCTION OF SAME

[75] Inventor: John Semen, Baton Rouge, La.

[73] Assignee: Ablemarle Corporation, Richmond, Va.

[*] Notice: This patent is subject to a terminal disclaimer.

[21] Appl. No.: 09/203,941

[22] Filed: Dec. 2, 1998

[51] Int. Cl.$^7$ ..................................................... C09K 15/24
[52] U.S. Cl. .............................. 252/404; 252/397; 585/2; 585/3; 585/24
[58] Field of Search ............................................... 242/404

[56] References Cited

U.S. PATENT DOCUMENTS

| | | | |
|---|---|---|---|
| 4,439,570 | 3/1984 | Messina et al. | 524/154 |
| 4,761,247 | 8/1988 | Rei et al. | 252/364 |
| 4,806,580 | 2/1989 | Bock et al. | 524/110 |
| 4,957,956 | 9/1990 | Neri et al. | 524/120 |
| 5,597,857 | 1/1997 | Thibaut et al. | 524/400 |
| 5,772,921 | 6/1998 | Gilg et al. | 252/404 |
| 5,846,656 | 12/1998 | Dunski | 428/402 |

*Primary Examiner*—Ellen M. McAvoy
*Attorney, Agent, or Firm*—Philip M. Pippenger

[57] ABSTRACT

The present invention is directed to a process for the production of agglomerates of a blend of a sterically hindered phenol antioxidant and an acid neutralizer such that the agglomerates have a balanced hardness to resist abrasion during conveyance yet being readily dispersed in a host plastic. Such agglomerates are achieved through the use of a processing aid consisting of an alcohol of the formula ROH wherein R is an alkyl group of 1 to 8 carbon atoms, either alone or having up to 80% by volume of a cosolvent selected from the group consisting of methylene chloride, chloroform, toluene, acetone, methylethylketone, xylene, cyclohexane, styrene, methylcyclohexane, and hexane. The cosolvent processing aid has at least 1 gram of antioxidant dissolved therein per 100 mL of solvent. The processing aids are used to form a paste of a mixture of antioxidant and an acid neutralizer. The resulting paste is then subjected to agglomeration and the resulting agglomerates are thereafter dried. Through the controlled use of alcohol in the processing aid there is achieved a control on the hardness of the resulting agglomerates which is inverse to the amount of alcohol employed in the system.

26 Claims, No Drawings

LOW DUST BALANCED HARDNESS ANTIOXIDANT AGGLOMERATES AND PROCESS FOR THE PRODUCTION OF SAME

FIELD OF THE INVENTION

The present invention relates to low dust agglomerates of a sterically hindered phenol antioxidant and an acid neutralizer having a balanced hardness and to a process for the production of such balanced hardness agglomerates.

BACKGROUND OF THE INVENTION

Organic polymers (plastics) and in particular polyolefins, such as polyethylene and polypropylene require, the addition of various additive systems thereto in order both to be processed and to retain long term stability in order to retain desired service properties. In addition to the damaging influence of light and heat, residues of the catalyst system used in the production of such plastics are also detrimental. To overcome such difficulties, a wide variety of substances are known in the art for use as additives and stabilizers. In many instances a mixture of such additives is employed.

One commonly used additive system is that comprising a sterically Nov. 17, 1998 hindered phenol antioxidant which is employed in combination with an acid neutralizer. Since such antioxidants and acid neutralizers are in the powder form, there is presented a disadvantage in the use of same in an additive system due to the problem of dusting as well as having a tendency toward separation and proving difficult to meter. Thus there exists a need for a commercial form of antioxidant additives which does not have these disadvantages.

While a variety of approaches have been made to achieve the production of a low dust additive system, such processes have generally employed systems that introduce into the additive package a further component such as calcium stearate, water, or other binders.

Other prior art systems using mixing processes or compacting are known, but in most cases the resulting commercial forms do not have adequate mechanical properties.

In addition to an additive package having adequate mechanical strength or hardness so as to have sufficient abrasion resistance to preclude dust formation, such an additive package also needs to have a balanced hardness which will permit it to be readily processed in the systems wherein the additive package is being dispersed into the host plastic.

Accordingly, there remains a need for a balanced strength antioxidant-acid neutralizer additive system which possesses adequate mechanical strength to avoid mechanical abrasion and dust formation while at the same time having a balanced hardness which will permit it to be readily dispersed in the host plastic, while at the same time avoiding the introduction of undesired components.

Since the agglomerated additive systems of the present invention have a spherical shaped structure, such agglomerates exhibit good flow characteristics which permit the use of softer particles to achieve good metering and better dispersability of the additive system into the host plastic.

In addition, by controlling the hardness of the agglomerated additive package in accordance with the present invention, there is provided a process for the production of customized agglomerate additive systems.

It is thus an object of the present invention to provide a process for the production of novel aggregate of a sterically hindered phenol antioxidant and an acid neutralizer blends which will avoid the introduction of undesired components into the additive system.

Another object of this invention, is to provide a novel sterically hindered phenol-acid neutralizer additive system in an agglomerated form which will have a balanced hardness so as to provide adequate abrasion resistance yet being readily dispersed in a host plastic.

Other aspects, objects, and the several advantages of this invention will become apparent from the following specification and claims.

SUMMARY OF THE INVENTION

In accordance with one embodiment of the present invention, I have discovered that an agglomerate of a sterically hindered phenol antioxidant and an acid neutralizer blend having a balanced hardness so as to provide adequate abrasion resistance while being readily dispersable in a host plastic can be produced by a process which comprises:

(a) dissolving a first portion of said sterically hindered phenol antioxidant in a cosolvent system consisting essentially of an alcohol of the formula ROH wherein R is an alkyl group of 1–8 carbon atoms and up to about 80 weight percent of a cosolvent selected from the group consisting of methylene chloride, chloroform, toluene, acetone, methylethylketone, xylene, cyclohexane, styrene, methylcyclohexane and hexane so as to form a processing aid of said sterically hindered phenol in said solvent system;

(b) contacting a mixture of a second portion of said sterically hindered phenol antioxidant and an acid neutralizer with the processing aid system of step (a) in an amount to form a paste of the mixture;

(c) agglomerating the resulting paste of the sterically hindered phenol antioxidant and said acid neutralizer as formed in step (b); and (d) drying the resulting agglomerates of sterically hindered phenol antioxidant and acid neutralizer as formed in step (c) so as to form dried agglomerates thereof having a balanced hardness.

Further in accordance with this invention, I have discovered that when the cosolvent and antioxidant are omitted from the processing aid liquid, there can be produced an agglomerate of the sterically hindered phenol antioxidant-acid neutralizer blend which has a maximum softness yet which has a hardness sufficient for abrasion resistance by contacting the blend of sterically hindered phenol and acid neutralizer directly with at least one alcohol of the formula ROH wherein R is an alkyl group of from 1 to 8 carbon atoms in an amount sufficient to form a paste of the blend.

Accordingly, in a further embodiment of the present invention, I have discovered that an agglomerate of a sterically hindered phenol antioxidant and an acid neutralizer having a maximum softness yet having a hardness sufficient as to provide adequate abrasion resistance while being readily dispersable in a host plastic can be produced by a process which comprises:

(a) contacting a mixture of a sterically hindered phenol antioxidant and an acid neutralizer with an alcohol of the formula ROH wherein R is an alkyl group of 1–8 carbon atoms in an amount sufficient to form a paste of the mixture of sterically hindered phenol antioxidant and acid neutralizer blend;

(b) agglomerating the resulting paste of sterically hindered phenol antioxidant and acid neutralizer as formed in step (a); and (c) drying the resulting agglomerates of sterically hindered phenol antioxidant and acid neutralizer as formed in step (b) so as to form dried agglomerates thereof.

The agglomerates produced through the use of an alcohol alone in the production of same provides an agglomerate having minimum hardness.

Thus, there is provided by the present invention novel agglomerates of a mixture of a sterically hindered phenol antioxidant and an acid neutralizer through the use of a processing aid formed of a solvent system consisting essentially of a lower alkyl alcohol alone or having up to about 80 weight percent of a cosolvent. When a cosolvent is used, there is dissolved therein at least 1 gram of sterically hindered phenol antioxidant per 100 mL of solvent system. The amount of alcohol employed in the solvent system is such that as the amount of alcohol is increased, there is achieved a decrease in the balanced hardness of the agglomerate of the sterically hindered phenol antioxidant-acid neutralizer blend formed therewith. As the amount of alcohol is decreased, there is achieved an increase in the balanced hardness of the agglomerate formed therewith.

In addition to the discovery of a cosolvent system for the production of agglomerates of an additive package consisting essentially of a mixture of a sterically hindered phenol antioxidant and an acid neutralizer, it was further discovered that an agglomerate of such an additive package could be prepared using as the processing aid only an alcohol of the formula ROH wherein R is an alkyl group of 1 to 8 carbon atoms. When the processing aid consists of the alcohol alone, the additive powder blend to be agglomerated can be directly contacted with the alcohol in an amount to form a paste of the additive blend which is then subjected to agglomeration.

DETAILED DESCRIPTION OF THE INVENTION

The present invention is based upon the discovery that agglomerates of an additive package consisting essentially of a mixture of a sterically hindered phenol antioxidant and an acid neutralizer, which exhibit a balanced hardness such that the agglomerates avoid the problem of dust and abrasion while being readily dispersable in a host plastic, can be produced when used as an initial binder for the sterically hindered phenol antioxidant-acid neutralizer blend by a processing aid consisting of an alcohol of the formula ROH alone or formed by dissolving a first portion of the antioxidant to be agglomerated in a cosolvent system consisting essentially of an alcohol of the formula ROH wherein R is a lower alkyl group having from 1 to 8 carbon atoms therein having up to about 80 weight percent of a cosolvent selected from the group consisting of methylene chloride, chloroform, toluene, acetone, methylethylketone, xylene, cyclohexane, styrene, methyl-cyclohexane, and hexane and having at least 1 gram of antioxidant dissolved therein per 100 mL of cosolvent.

A mixture of the selected sterically hindered phenol and acid neutralizer is then contacted with the processing aid in an amount sufficient to form a paste of the mixture. The resulting paste is then subjected to agglomeration and the resulting agglomerates then dried so as to provide agglomerates of the additive mixture having a balanced hardness.

While any solvent which is capable of dissolving the particular sterically hindered phenol antioxidant which is desired to be agglomerated can be employed in the cosolvent processing aid of this invention, a presently preferred cosolvent is one selected from the group consisting of methylene chloride, chloroform, toluene, acetone, methylethylketone, xylene, cyclohexane, styrene, methyl-cyclohexane, and hexane. The presently preferred solvents are acetone and methylethylketone.

The antioxidants of the sterically hindered phenol type are well known for organic materials and are frequently used for the stabilization of polymers. Such compounds preferably contain at least one group of the formula:

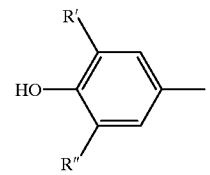

in which R' is hydrogen, methyl or tert-butyl and R" is unsubstituted or substituted alkyl or substituted alkylthioalkyl.

Suitable sterically hindered phenol type antioxidants useful in the practice of the present invention are those selected from the group consisting of alkylated monophenols, alkylthiomethylphenols, hydroquinones, alkylated hydroquinones, tocophenols, hydroxylated thiodiphenyl ethers, alkylidene bisphenols, o, s, and s-benzyl compounds, hydroxybenzylated malonates, hydroxybenzyl aromatics, triazines, benzylphosphonates, acylaminophenols, esters of β-(5-tert-butyl-4-hydroxy-3-methylphenyl)propionic acid, esters of β-(3,5-dicyclo-hexyl-4-hydroxyphenyl)propionic acid, esters of 3,5-di-tert-butyl-4-hydroxy-phenylacetic acid, and amides of β-(3,5-di-tert-butyl4-hydroxyphenyl) propionic acid.

Presently preferred sterically hindered phenol antioxidants for the practice of the present invention is one selected from the group consisting of:

octadecyl 3,5-di-t-butyl-4-hydroxyhydrocinnamate, tetrakis[methylene(3,5-di-t-butyl-4-hydroxylhydrocinnamate)]methane, 1,3,5-trimethyl-2,4,6-tris-(3,5-di-t-butyl-4-hydroxybenzyl)benzene, 1,3,5-tris-(3,5-di-t-butyl-4-hydroxybenzyl)isocyanurate, 1,3,5-tris-(4-t-butyl-3-hydroxy-2,6-dimethylbenzyl)-1,3,5-triazine-2,4,6-(1H, 3H, 5H)trione, and thiodiethylbenebis-(3,5-di-t-butyl4-hydroxy) hydrocinnamate.

Presently, the most preferred antioxidant for the practice of this invention is 1,3,5-trimethyl-2,4,6-tis-(3,5-di-tert-butyl-4-hydroxybenzyl)benzene. Such antioxidant is a product of Albemarle Corporation and available under the trademark ETHANOX® 330.

In carrying out the process of the present invention, the processing aid can contain from 0 to about 80 weight percent of a cosolvent of the formula ROH wherein R is an alkyl group of 1 to 8 carbon atoms. By varying concentration of ROH in system through the addition of the alcohol to the solvent system utilized for the forming of a paste of the sterically hindered phenol antioxidant and acid neutralizer, there is achieved a continuing modification of the hardness of the resulting agglomerates such that as the percent content of the alcohol in the system increases there is affected a decrease in the hardness value of the agglomerate thus permitting the custom formation of an antioxidant agglomerate having a predetermined hardness such that there is a balance between that hardness required for the avoiding of abrasion and thus dust and that hardness which will permit the ready dispersion of the agglomerated antioxidant in the host plastic for same. Thus, the effect of the alcohol in the system is inverse to the amount of alcohol present in the solvent/alcohol system.

Presently preferred alcohols for use in the practice of the present invention is one selected from the group consisting of methanol ethanol, and isopropanol. The alcohol of particular preference at this time is methanol.

As used herein the term "plastic" is intended to mean organic polymers such as the olefin polymers of ethylene and propylene or mixtures thereof with other olefin monomers.

As used herein the term "agglomerate" is intended to mean a small, spherical body consisting essentially of a sterically hindered phenol antioxidant and an acid neutralizer which has been produced through the agglomeration of the mixture of antioxidant and acid neutralizer in an agglomerator such as a pin agglomerator.

The term "processing aid" as used herein intended to mean an alcohol of the formula ROH wherein R is an alkyl group of 1–8 carbon atoms when the desired agglomerates are formed through the use of an alcohol alone in effecting the desired agglomeration of the sterically hindered phenol—acid neutralizer blend and in that instance wherein the processing aid is formed of a cosolvent system of such an alcohol and a cosolvent for the antioxidant selected from the group consisting of methylene chloride, chloroform, toluene, acetone, methyl ethyl ketone, xylene, cyclohexane, styrene, methylcyclohexane and hexane there is dissolved in said cosolvent system at least 1 gram of a sterically hindered phenol antioxidant per 100 mm of cosolvent.

Through the use of controlled amounts of the alcohol in the cosolvent processing aid of the present invention, there is achieved a control of the friability or hardness of the ultimately produced agglomerate product.

While in one presently preferred embodiment of this invention, there is provided an agglomerate product of ETHANOX® 330 Antioxidant and an acid neutralizer which has a balance of hardness so as to permit transportation while being readily dispersed in the compounding of same in an organic host polymer or plastic, it will be appreciated that other antioxidants can likewise be employed in the practice of this invention either alone or in combination with other selected ingredients or coadditives. Thus, through the process of this invention, there can be produced customized additive systems having a balance of hardness which employs the selected sterically hindered phenol antioxidant in combination with an acid neutralizer and optionally other desired additives for introduction into the host organic polymer.

The amount of the antioxidant of the sterically hindered phenol type in the agglomerates of the present invention will depend on the intended use of the agglomerate additive. Thus, the agglomerate of this invention can consist of about 15 to 85 weight percent antioxidant and from about 85 to 15 weight percent of acid neutralizer.

When such additive system is formed in admixture with other components such as a phosphite antioxidant in the formation of a desired additive system, the agglomerate should contain at least 20% by weight of the sterically hindered phenol antioxidant.

The acid neutralizer component of the agglomerates of the present invention is at least one compound from the series consisting of metal oxides, metal carbonates, and hydrotalcites. Such compounds are well known for achieving acid neutralization in an additive system.

Hydrotalcites are well known and commercially available from Kyowa Chemical Company of Japan. Of particular suitability is that hydrotalcite is available under the trademark DHT-4V.

Presently preferred metal oxides are the oxides of divalent metals. Such compounds include the oxides of zinc and magnesium.

Presently preferred metal carbonates are the carbonates of divalent metals. Such compounds include the carbonate of calcium and magnesium such as the magnesium aluminum hydroxy carbonate hydrate compounds having the general formula $Mg_{4.5}Al_2(OH)_{13}CO_3 \cdot XH_2O$ wherein X is from 1 to 5.

Other compounds which can be included in the additive agglomerate system of this invention include those plastic additives selected from the group consisting of metal soaps, antistatics, antiblocking agents, flame proofing agents, thioesters, internal and external lubricants, pigments, UV absorbers, and light stabilizers.

Besides the sterically hindered phenol antioxidant and acid neutralizer, the agglomerates of this invention can optionally also contain a secondary phosphite antioxidant such as phosphites, phosphonates, and fluorophosphonates. Examples of suitable secondary phosphite antioxidants are:

2,2'-ethylidenebis-(4,6-di-t-butylphenyl)-Fluorophosphonite, 2,2',2"-nitro[triethyl-tris(3,3',5,5'-tetra-t-butyl-1,1'-biphenyl-2,2'-diyl)]phosphite, tris(2,4-di-t-butylphenyl)phosphite, bis(2,4-di-t-butylphenyl)pentaerythritol-di-phosphite, and tetrakis(2,4-di-t-butylphenyl)-4,4'-biphenylenediphosphonite.

The amount of secondary phosphite antioxidant used will depend on the intended use of the plastic additive package. Such agglomerates can thus contain from 0 to about 70 percent by weight of secondary phosphite antioxidant. When in addition to the sterically hindered phenol antioxidant there is employed a secondary phosphite antioxidant, the weight ratio between the sterically hindered phenol antioxidant and the secondary phosphonite antioxidant is within the range of from about 20:1 to about 1:5.

In carrying out the process of this invention, the initially selected alcohol for the antioxidant and acid neutralizer can be used alone or can have added thereto up to 80 weight percent of cosolvent The initial dissolving of antioxidant and acid neutralizer into the selected cosolvent system can be carried out separately from the total antioxidant mass to be agglomerated in accordance with the present invention, or the solvent system can be added to the antioxidant-acid neutralizer blend in an amount such that at least 1 gram of antioxidant per 100 mL of solvent is dissolved in the solvent and the resulting solution is brought in situ into contact with the remaining antioxidant-acid neutralizer blend so as to effect the formation of a paste of the antioxidant-acid neutralizer blend which is suitable for agglomeration. Typically, the concentration of the solvent processing aid (i.e., alcohol plus selected cosolvent, if any) required to form the paste, which is suitable for agglomeration, ranges from about 3 parts by weight solvent processing aid per 97 parts by weight of additive powder (i.e., phenolic antioxidant and acid neutralizer) to about 20 parts by weight of solvent processing aid per 80 parts by weight of additive powder.

EXAMPLES

The following examples are intended to be illustrative of the present invention and to teach one of ordinary skill how to make and use the invention. These examples are not intended to limit the invention in any way.

In the examples which follow, all proportions of materials are given in parts by weight. Unless noted otherwise, the agglomeration process was performed by: 1) adding the indicated proportions of the processing aid liquid and of the additive powder to a glass Erlenmeyer flask; 2) admixing the materials of Step (1) with a spatula until a paste-like slurry formed; 3) rotating the flask at about 60 rpm with a roto-evaporator head while simultaneously tapping the flask gently with the fingers (to simulate the tumbling action of a drum or pin agglomerator apparatus) to affect the agglomeration into spherical particles; 4) transferring the agglomerated particles to a petri dish for drying in a forced-air oven at the indicated temperature. In those cases where the "additive powder" of Step (1) comprised a mixture of two or more powder components, the powder mixture was dry blended prior to adding the processing aid liquid.

In the examples, process ability testing or agglomerate hardness measurements to determine the processability characteristics of the agglomerates, i.e. hardness and attrition resistance was determined by subjecting the agglomerates to manual manipulation so as to observe the friability of the agglomerate.

Example I
Agglomeration of ETHANOX® 330/Hydrotalcite Additive System 1 part of hydrotalcite powder (commercially available from Kyowa Chemical Company under the trademark DHT-4V) and 2 parts of 1,3,5-trimethyl-2,4,6-tris-(3,5-di-tert-butyl-4-hydroxybenzyl benzene), commercially available from Albemarle Corporation under the trademark ETHANOX® 330, were dry blended to form the desired additive system powder composition. This additive system powder was agglomerated using 0.79 parts of methanol processing aid per 5 parts of powder. The resulting agglomerate was dried at 85° C. The dried agglomerate was dry sieved with a U.S. Standard No. 8, 19 screen to remove the fine particles (−18 mesh) and to obtain the desired additive system agglomerate particles in 80% yield. The resulting product consisted of essentially spherical particles ranging in a size from about 1 mm to about 4 mm in diameter. The resulting product of agglomerated particles were subject to manual characterization and judged to have very good hardness and therefore goods resistance to particle attrition during conveying operations.

Example II
Agglomerate of ETHANOX® 330/Hydrotalcite/Secondary Phosphite Additive System 42 parts of ETHANOX® 330 Antioxidant, 52 parts of a commercially available secondary phosphite antioxidant, available from Ciba Specialty Chemicals under the trademark IRGAFOS 168, and 16 parts of DHT-4V hydrotalcite were dry blended to form the desired additive system powder composition. The additive system was agglomerated using 0.79 parts of denatured ethanol process aid per 6 parts of additive system powder composition. The resulting agglomerated particles were subjected to drying at 83° C. The resulting dried agglomerated product particles were dry sieved with a U.S. Standard No. 18 screen to give 77% yield of essentially spherical particles ranging in diameter from about 1 to about 5 mm. Manual characterization of the particles indicated very good hardness and therefore good resistance to particle attrition during conveying operations.

Example III
Agglomerate of ETHANOX® 330/Zinc Oxide/Secondary Phosphite Additive System Example II was essentially repeated but with 44 parts of ETHANOX® 330 Antioxidant, 38 parts of IRGAFOS 168, and 18 parts of ZnO (Grade AzO66L obtained from Midwest Zinc Company) as the desired additive system powder composition. Manual characterization of the dried agglomerated particles indicated very good particle hardness and therefore good resistance to particle attrition during conveying operations.

Example IV
Agglomerate of IRGANOX 1010/Hydrotalcite/Secondary Phosphite Additive System 5.3 parts of pentaerythritol ester of β-(3,5-di-tert-butyl-4-hydroxyphenyl)propionic acid, a commercially available hindered phenolic antioxidant obtainable from Ciba Specialty Chemicals under the trademark IRGANOX 1010, 1.59 parts of DHT-4V acid neutralizer, and 2.61 parts of IRGAFOS 168 were dry blended to obtain the desired additive system powder composition. Agglomeration of this additive system powder blend was affected using 1.1 parts of isopropanol as the processing aid per 9.5 parts of powder blend. The resulting agglomerate particles were dried at 85° C. The resulting dried agglomerates were to essentially spherical of nominally 1–5 mm diameter and having very good hardness.

Example V
Agglomeration With a Cosolvent Antioxidant Processing Aid 1 part of DHT4V hydrotalcite and 2 parts ETHANOX® 330 antioxidant were dry blended to form an additive system powder mix. This additive powder blend was agglomerated using as a processing aid liquid, 0.79 parts of a 50:50 mixture of acetone and methanol having 5 grams of ETHANOX® 330 Antioxidant per 100 mL cosolvent processing aid dissolved therein. The resulting agglomerate was dried at 85° C. The resulting agglomerate particles were then dry sieved with a U.S. Standard No. 18 screen sieve to remove the fine particles and to obtain the desired additive system agglomerate particles in 80% yield. The resulting agglomerated particles were essentially spherical and ranged in size from about 1 mm to about 5 mm in diameter. Using manual manipulation, the particles were judged to have a very good hardness. Moreover, the agglomerated particles obtained with the processing aid containing acetone cosolvent were considerably harder than the agglomerate of Example I.

Example VI
Agglomeration With a Cosolvent Antioxidant Processing Aid 1 part of DHT-4V hydrotalcite and 2 parts ETHANOX® 330 antioxidant were dry blended to form an additive system powder mix. This additive powder blend was agglomerated using as a processing aid liquid, 0.79 parts of a 50:50 mixture of acetone and denatured ethanol having 5 grams of ETHANOX® 330 Antioxidant per 100 mL cosolvent processing aid dissolved therein. The resulting agglomerate was dried at 85° C. The resulting agglomerate particles were than dry sieved with a U.S. Standard No. 18 screen sieve to remove the fine particles and to obtain the desired additive system agglomerate particles in 80% yield. The resulting agglomerated particles were essentially spherical and ranged in size from about 1 mm to about 5 mm in diameter. Using manual manipulation, the particles were judged to have a very good hardness. Moreover, the agglomerated particles obtained with the processing aid containing acetone cosolvent were considerably harder than the agglomerates of Example I.

Example VII
Agglomeration With a Cosolvent
Antioxidant Processing Aid 1 part of DHT-4V hydrotalcite and 2 parts of ETHANOX® 330 antioxidant were dry blended to form an additive system powder mix. This additive powder blend was agglomerated using as a processing aid liquid, 0.79 parts of a 30:70 mixture of acetone and methanol having 5 grams of ETHANOX® 330 Antioxidant per 100 mL cosolvent processing aid dissolved therein. The resulting agglomerate was dried at 85° C. The resulting agglomerate particles were then dry sieved with a U.S. Standard No. 18 screen sieve to remove the fine particles and to obtain the desired additive system agglomerate particles in 80% yield. The resulting agglomerated particles were essentially spherical and ranged in size from about 1 mm to about 5 mm in diameter. Using manual manipulation, the particles were judged to have a hardness which was intermediate to that of the corresponding particles of Examples I and V.

Example VIII
Agglomeration With a Cosolvent
Antioxidant Processing Aid 1 part of DHT-4V hydrotalcite and 2 parts ETHANOX® 330 antioxidant were dry blended to form an additive system powder mix. This additive powder blend was agglomerated using as a processing aid liquid, 0.79 parts of a 30:70 mixture of acetone and denatured ethanol having 5 grams of ETHANOX® 330 Antioxidant per 100 mL cosolvent processing aid dissolved therein. The resulting agglomerate was dried at 85° C. The resulting agglomerate particles were then dry sieved with U.S. Standard No. 18 screen sieve to remove the fine particles and to obtain the desired additive system agglomerate particles in 80% yield. The resulting agglomerated particles were essentially spherical and ranged in size from about 1 mm to about 5 mm in diameter. Using manual manipulation, the particles were judged to have a hardness which was intermediate to that of the corresponding particles of Examples I and V.

Examples V–VIII illustrate that the introduction of cosolvent and dissolved phenolic antioxidant into the processing aid produced an increase in the hardness of the agglomerate particles. In addition, Examples VII and VIII illustrate that the hardness of the agglomerate particles is controlled by the relative proportion of the cosolvent aid and the hardness varies inversely with the relative proportion of the alcohol.

The specific examples herein disclosed are to be considered as being primarily illustrative. Various changes beyond those described will occur to those skilled in the art and such changes are to be understood as forming a part of this invention as they fall within the spirit and scope of the appended claims.

That which is claimed is:

1. A process for the production of agglomerates of a mixture of a sterically hindered phenol antioxidant and an acid neutralizer which comprises
   (a) dissolving a first portion of said sterically hindered phenol antioxidant in a solvent system consisting essentially of an alcohol of the formula ROH wherein R is an alkyl group of 1 to 8 carbon atoms and from 0 to about 80 weight percent of a cosolvent selected from the group consisting of methylene chloride, chloroform, toluene, acetone, methylethylketone, xylene, cyclohexane, styrene, methylcyclohexane, and hexane so as to form a solution of said sterically hindered phenol antioxidant in said solvent;
   (b) contacting a mixture of a second portion of said sterically hindered phenol antioxidant and an acid neutralizer with said solution of step (a) in an amount sufficient to form a paste of said mixture;
   (c) agglomerating the resulting paste of said sterically hindered phenol antioxidant and said acid neutralizer as formed in step (b); and
   (d) drying the resulting agglomerates of said sterically hindered phenol antioxidant and said acid neutralizer as formed in step (c) so as to form dried agglomerates thereof having a balanced hardness.

2. A process according to claim 1 wherein said sterically hindered phenol is one that contains at least one group of the formula:

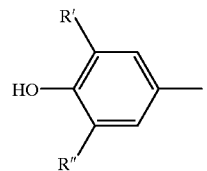

wherein R' is hydrogen, methyl or tert-butyl and R" is unsubstituted or substituted alkyl or substituted alkylthioalkyl.

3. The process of claim 2 wherein said sterically hindered phenol is at least one compound selected from the group consisting of alkylated monophenols, alkylthiomethylphenols, hydroquinones, alkylated hydroquinones, tocophenols, hydroxylated thiodiphenyl ethers, alkylidene bisphenols, o, s, and s-benzyl compounds, hydroxybenzylated malonates, hydroxybenzyl aromatics, triazines, benzylphosphonates, acylaminophenols, esters of β-(5 tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, and amides of β-(3,5-di-tert-butyl-4-hydroxyphenyl) propionic acid.

4. The process of claim 3 wherein said sterically hindered phenol antioxidant is a member of the group consisting of Octadecyl 3,5-di-t-butyl-4-hydroxyhydrocinnamate,
tetrakis[methylene(3,5-di-t-butyl-4-hydroxylhydrocinnamate)]methane,
1,3,5-trimethyl-2,4,6-tris-(3,5-di-t-butyl-4-hydroxybenzyl)benzene,
1,3,5-tris-(3,5-di-t-butyl-4-hydroxybenzyl)isocyanurate,
1,3,5-tris-(4-t-butyl-3-hydroxy-2,6-dimethylbenzyl)-1,3,5-triazine-2,4,6-(1H, 3H, 5H)trione, and
thiodiethylbenebis-(3,5-di-t-butyl-4-hydroxy)hydrocinnamate.

5. The process of claim 1 wherein said sterically hindered phenol antioxidant is 1,3,5-trimethyl-2,4,6-tris(3,5-di-tert-butyl-4-hydroxy-benzyl)benzene.

6. The process of claim 1 wherein said alcohol is selected from the group consisting of methanol, ethanol, and isopropanol.

7. The process of claim 5 wherein said solvent is acetone and said alcohol is methanol.

8. The process of claim 5 wherein said solvent is methylethyl-ketone and said alcohol is methanol.

9. The process of claim 1 wherein said acid neutralizer is a member of the group consisting of a metal oxide, a metal carbonate, and a hydrotalcite.

10. The process of claim 9 where the ratio of said sterically hindered phenol to said acid neutralizer antioxidant is in the range of about 1:20 to about 20:1.

11. The process of claim 1 wherein said acid neutralizer is magnesium aluminum hydroxy carbonate hydrate.

12. The process of claim 11 wherein there is additionally present with said sterically hindered phenol and acid neutralizer, a secondary phosphite antioxidant.

13. A process for the production of agglomerates of a mixture of a sterically hindered phenol antioxidant and an acid neutralizer which comprises:

(a) contacting a mixture of said sterically hindered phenol antioxidant and an acid neutralizer with an alcohol of the formula ROH wherein R is an alkyl group of 1 to 8 carbon atoms in an amount to form a paste of said mixture;

(b) agglomerating the resulting paste of said sterically hindered phenol antioxidant and said acid neutralizer as formed in step (a); and (c) drying the resulting agglomerates of said sterically hindered phenol antioxidant and said acid neutralizer as formed in step (b) so as to form dried agglomerates thereof.

14. A process according to claim 13 wherein said sterically hindered phenol is one that contains at least one group of the formula:

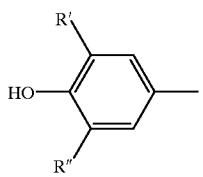

wherein R' is hydrogen, methyl or tert-butyl and R" is unsubstituted or substituted alkyl or substituted alkylthioalkyl.

15. The process of claim 14 wherein said sterically hindered phenol is at least one compound selected from the group consisting of alkylated mono-phenols, alkylthiomethylphenols, hydroquinones, alkylated hydroquinones, toco-phenols, hydroxylated thiodiphenyl ethers, alkyl idene bisphenols, o, s, and s-benzyl compounds, hydroxybenzylated malonates, hydroxybenzyl aromatics, triazines, benzylphosphonates, acylaminophenols, esters of β-(5 tert-butyl-4-hydroxy-3-methylphenyl)propionic acid, esters of β-(3,5-dicyclohexyl-4-hydroxy-phenyl)propionic acid, esters of 3,5-di-tert-butyl-4-hydroxyphenylacetic acid, and amides of β-(3,5-di-tert-butyl-4-hydroxyphenyl)propionic acid.

16. The process of claim 15 wherein said sterically hindered phenol antioxidant is a member of the group consisting of octadecyl 3,5-di-t-butyl-4-hydroxyhydrocinnamate, tetrakis[methylene(3,5-di-t-butyl-4-hydroxylhydrocinnamate)]methane, 1,3,5-trimethyl-2,4,6-tris-(3,5-di-t-butyl-4-hydroxybenzyl)benzene, 1,3,5-tris-(3,5-di-t-butyl-4-hydroxybenzyl)isocyanurate, 1,3,5-tris-(4-t-butyl-3-hydroxy-2,6-dimethylbenzyl)-1,3,5-triazine-2,4,6-(1H, 3H, 5H)trione, and thiodiethylbenebis-(3,5-di-t-butyl-4-hydroxy) hydrocinnamate.

17. The process of claim 1 wherein said sterically hindered phenol antioxidant is 1,3,5-trimethyl-2,4,6-tris(3,5-di-tert-butyl-4-hydroxy-benzyl)benzene.

18. The process of claim 1 wherein said alcohol is selected from the group consisting of methanol ethanol, and isopropanol.

19. The process of claim 1 wherein said alcohol is methanol.

20. The process of claim 13 wherein said acid neutralizer is a member of the group consisting of metal oxide, a metal carbonate, and a hydrotalcite.

21. The process of claim 13 wherein the ratio of said sterically hindered phenol antioxidant to said acid neutralizer is in the range of about 1:20 to 20:1.

22. The process of claim 20 wherein said acid neutralizer is magnesium aluminum hydroxy carbonate hydrate.

23. The process of claim 20 wherein said acid neutralizer is a hydro-talcite.

24. The agglomerated sterically hindered phenol antioxidant product of the process of claim 1.

25. The agglomerated sterically hindered phenol antioxidant product of the process of claim 13.

26. The process of claim 1 wherein said sterically hindered phenol antioxidant is pentaerythrityl ester of β-(3,5-di-tert-butyl-4-hydroxy phenyl)propionic acid.

* * * * *